United States Patent [19]

Krude

[11] 4,156,354
[45] May 29, 1979

[54] ANGULARLY FLEXIBLE CARDAN SHAFT JOINT

[75] Inventor: Werner Krude, Neunkirchen, Fed. Rep. of Germany

[73] Assignee: Uni-Cardan Aktiengesellschaft, Lohmar, Fed. Rep. of Germany

[21] Appl. No.: 808,318

[22] Filed: Jun. 20, 1977

[30] Foreign Application Priority Data

Jul. 31, 1976 [DE] Fed. Rep. of Germany ....... 2634581

[51] Int. Cl.$^2$ ............................ F16D 3/06; F16D 3/30
[52] U.S. Cl. .......................................... 64/23.7; 64/8; 64/21
[58] Field of Search .......................... 64/8, 7, 21, 23.7; 403/53, 61, 57

[56] References Cited

U.S. PATENT DOCUMENTS

| | | | |
|---|---|---|---|
| 1,847,677 | 3/1932 | Sternbergh | 64/7 |
| 2,910,845 | 11/1959 | Wahlmark | 64/21 |
| 3,608,937 | 9/1971 | Nave | 403/57 |
| 3,729,953 | 5/1973 | Wanzer | 64/14 X |
| 3,789,624 | 2/1974 | Camosso | 64/8 X |
| 3,802,221 | 4/1974 | Kimata | 64/8 |
| 3,899,898 | 8/1975 | Takahashi et al. | 64/8 X |
| 3,930,378 | 1/1976 | Schmid | 64/8 |
| 4,012,925 | 3/1977 | Krude | 64/8 X |

FOREIGN PATENT DOCUMENTS

| | | | |
|---|---|---|---|
| 1185868 | 1/1965 | Fed. Rep. of Germany | 64/8 |
| 2219868 | 11/1972 | Fed. Rep. of Germany | 64/21 |
| 7339880 | 9/1973 | Fed. Rep. of Germany. | |
| 2225499 | 11/1973 | Fed. Rep. of Germany. | |
| 2355766 | 11/1973 | Fed. Rep. of Germany. | |
| 2355764 | 5/1975 | Fed. Rep. of Germany | 64/21 |
| 350954 | 6/1905 | France | 64/8 |

*Primary Examiner*—Leslie Braun
*Attorney, Agent, or Firm*—Toren, McGeady and Stanger

[57] ABSTRACT

A cardan joint for transmitting driving torque between rotative members includes an inner joint member fixed to one of the rotative members and an outer joint member fixed to the other of the rotative members. A plurality of roller bodies are engaged for transmission of torque between the inner and outer joint members. The inner joint member is formed with apertures having the roller bodies radially slidably received therein and grooves are formed in the outer joint members for guided engagement with the roller bodies. The roller bodies each are formed with spherical portions thereon, with a spherical portion of each roller body being in contact with the spherical portion of at least one other roller body so that the roller bodies provide mutual support for each other inwardly of the joint toward the joint center.

7 Claims, 11 Drawing Figures

ANGULARLY FLEXIBLE CARDAN SHAFT JOINT

BACKGROUND OF THE INVENTION

The present invention relates generally to cardan joints and more specifically to an angularly flexible cardan shaft joint wherein driving torque is transmitted by means of roller bodies interposed between an inner and an outer joint member of the joint assembly. More particularly, the invention involves joints of the type where the roller bodies are equidistantly spaced circumferentially of the joint assembly with each roller body being received in recesses of the inner joint member for radially slidable engagement relative thereto and where the outer joint member is formed with grooves for guiding the roller bodies.

Conventional joints of this type, known according to, for example, German PS No. 2,225,499, German AS No. 2,355,766 and German GM No. 7,339,880, have certain disadvantages inasmuch as a special steering or directional control member is required for proper functioning of the joint. Such a steering member may be either rigidly connected with the outer joint member of the joint assembly or it may be formed as an integral part thereof. If the directional control member is a separate unit, then it must be maintained in working position by means of additional springs or similar devices. Provisions of this kind tend to be expensive and they have the effect of increasing the manufacturing costs of such devices to such an extent that the joint may become impractical from an economic viewpoint.

Under the circumstances, the present invention is aimed toward provision of a joint assembly of the type discussed which, because of its ability to dispense with the directional control member, is capable of achieving simplification and cost reduction while simultaneously providing a superior capacity for torque transmission with a comparatively smaller overall structural space requirement for the joint.

SUMMARY OF THE INVENTION

Briefly, the present invention may be described as a cardan joint for transmitting driving torque between a pair or rotative members comprising an inner joint member fixed to one of the rotative members, an outer joint member fixed to the other of said rotative members, a plurality of roller bodies engaged for transmission of torque between said inner and outer joint members, aperture means in said inner joint member having said roller bodies radially slidably received therein and groove means in said outer joint member having said roller bodies guided therein, with the roller bodies having a spherical portion thereon, with a spherical portion of each of the roller bodies being in contact with a spherical portion of at least one of the other roller bodies in a manner whereby the roller bodies provide mutual support for each other inwardly of said joint towards the center of the joint.

Thus, the aims of the invention are achieved in that the roller bodies are at least partially formed with a spherical configuration and in that the diameter of the spherical areas of the roller bodies is shaped to be such that the roller bodies will provide mutual support for each other on the side thereof which is directed toward the center of the joint.

The resulting advantages of the invention are that such a joint is much easier to manufacture inasmuch as the outer joint member only requires machining in order to form one track groove for each roller body. Furthermore, in view of the small rolling circle diameters, the exterior diameter of the joint as a whole also remains comparatively small.

In accordance with another aspect of the invention, in order to allow roller bodies of larger diameters to be used, the invention provides that such roller bodies be essentially made in the form of balls which are provided with flat faces in the direction of rotation thereof whereby the roller bodies have planar engagement along corresponding flats provided in the recessed openings of the inner joint member.

A special advantage arises as a result of such an arrangement insofar as substantially reduced overall dimensions are concerned. The inner joint member is not required to support the roller bodies to the vertical level of the rolling circle but support can be provided in the direction towards the center of the joints by means of such flats. As a result, the outer diameter of the inner joint member may be made of substantially smaller size. Furthermore, area compression between the roller bodies and the recesses in the inner joint member exhibits a more favorable characteristic thereby giving rise to increased torque transmission capacity.

In another aspect of the invention, the roller bodies may be made in the form of cylindrical pins with spherical end caps with the corresponding recesses in the inner joint member being made of cylindrical form. As a result of this aspect of the invention, the roller bodies may be made from standardized commercial material or bar stock.

In an additional aspect of the invention, a cushion pad, which may be, for example, made of plastic material or rubber, is arranged centrally of the joint assembly surrounded by the roller bodies. The cushion pad operates to take up play, and it should be understood that the rubber or plastic pad is not required insofar as the actual joint function is concerned. However, in joints where the balls are received without a press fit in the recesses of the inner joint member, such a pad can significantly help to reduce or prevent excessive noise generation.

Joints of the type to which the present invention relates may be utilized as drive transmitting or steering joints in machine tool drives or for high speed longitudinal shafts in motor vehicle construction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
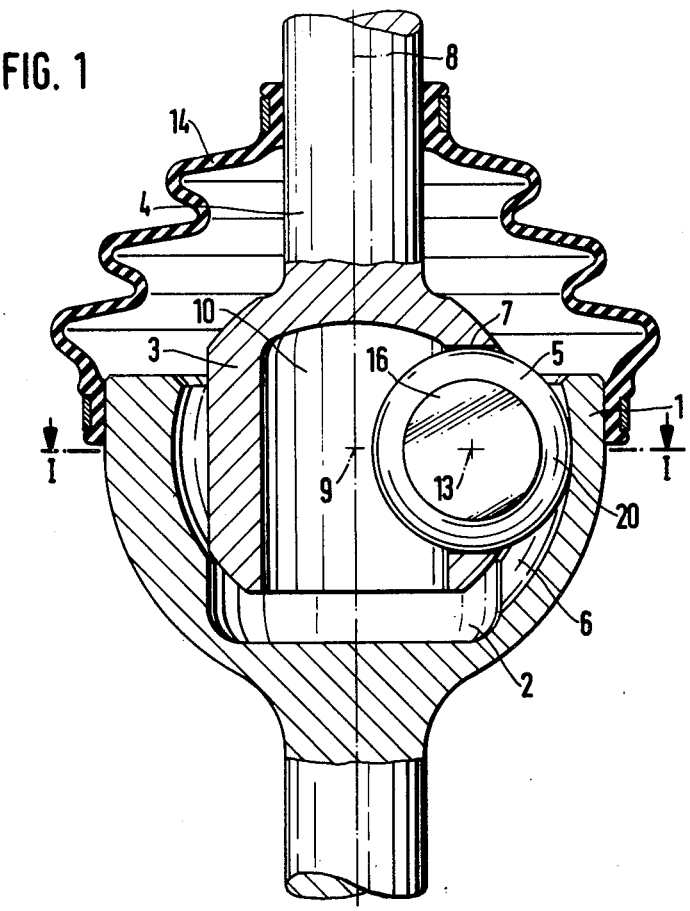
FIG. 1 is a sectional view taken in the axial direction of a homokinetic transmission joint embodying the present invention.
Figure 2:
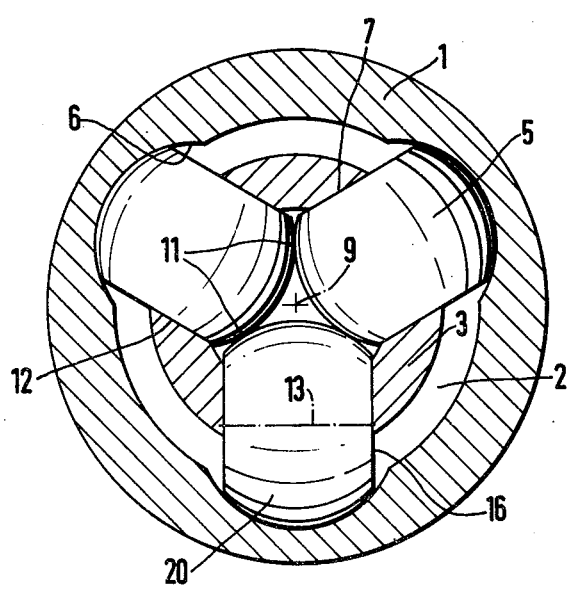
FIG 2 is a sectional view taken along the line I—I of the joint shown in FIG. 1.

Referring now to the drawings, wherein like reference numerals are used to refer to similar parts throughout the various figures thereof, the joint assembly illustrated in FIGS. 1 and 2 is essentially comprised of an outer joint member 1 and an inner joint member 3, with the inner joint member 3 being received in a cavity 2 of the outer joint member. The inner joint member 3 is integrally connected with a shaft 4. Driving torque is transmitted by spherical areas 20 of roller bodies 5 which are received, on one side thereof, in track grooves 6 formed in the outer joint member 1 and, on the other side thereof, within recesses 7 formed in the inner joint member 3.

The grooves 6 of the outer joint member 1 extend in an arcuate configuration in the axial direction of the joint assembly, with the generating radius of the arc being preferably situated on the rotational axis 8 of the joint assembly. The recesses 7 of the inner joint member 3 are configured to provide an opening having a cross sectional configuration which corresponds to the configuration of the roller bodies 5. Thus, the roller bodies 5 are retained in recesses 7 in such a manner as to be capable of radially directed sliding movement while being rotatively fixed relative to the inner joint member 3.

In order to provide mutual support for the roller bodies 5 in a direction radially inwardly of the joint on a side of each of the roller bodies 5 facing the joint center 9, the inner joint member 3 is provided with a cavity 10. The spherical faces 20 of the roller bodies 5 are arranged so that mutual support is provided at points 11 of mutual contact between the roller bodies. Thus, as best seen in FIG. 2, each of the roller bodies 5 is formed to include spherical portions 20. When the roller bodies are arranged as depicted, a spherical portion of one roller body will be in contact with the spherical portion of at least one other roller body and in the case of the embodiment of FIG. 2, each roller body is in contact with two other roller bodies.

As a result of the circumferentially flat shape of the roller bodies 5, it is possible to maintain the diameter of the inner joint member small since the engagement and supporting are along opening walls 12 of the recesses 7 for the roller bodies 5, or flats 16 formed on the roller bodies, may be situated externally of the axis of symmetry 13 on that half of the roller body 5 which faces the joint center 9.

The joint assembly which is illustrated in FIGS. 1 and 2 is a non-sliding or longitudinally rigid joint. This joint achieves homokinetic or constant velocity drive transmission because of the special arcuate or curvilinear disposition of the grooves 6 in the outer joint member 1.

A concertina boot 14 is provided, as shown in FIG. 1, in order to seal the interior of the joint assembly against penetration therein of dirt and dust from the outside.

Figure 3:
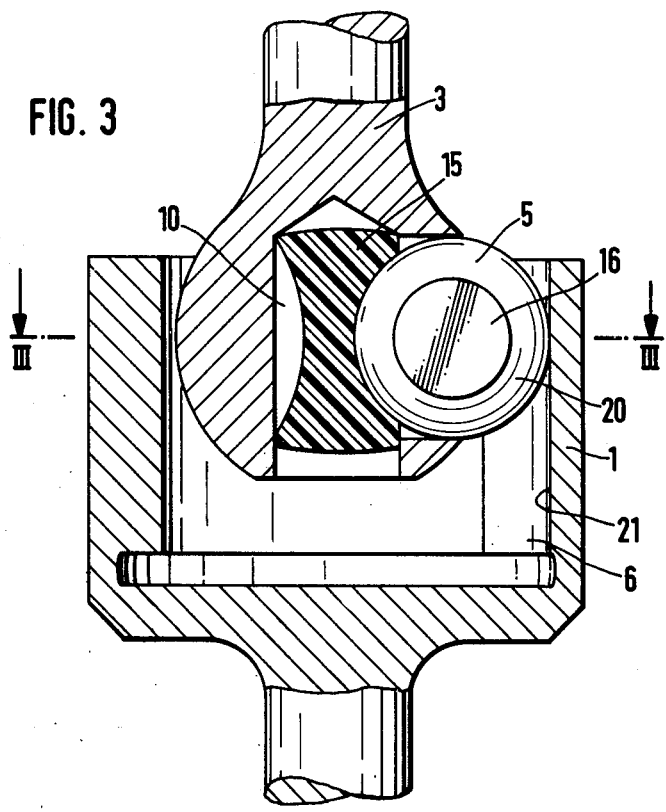
FIG. 3 is a sectional view of a joint which, in principle, is similar to the joint of FIG. 1 but which involves provision of a centrally located cushion pad for absorbing play between the roller bodies.
Figure 4:
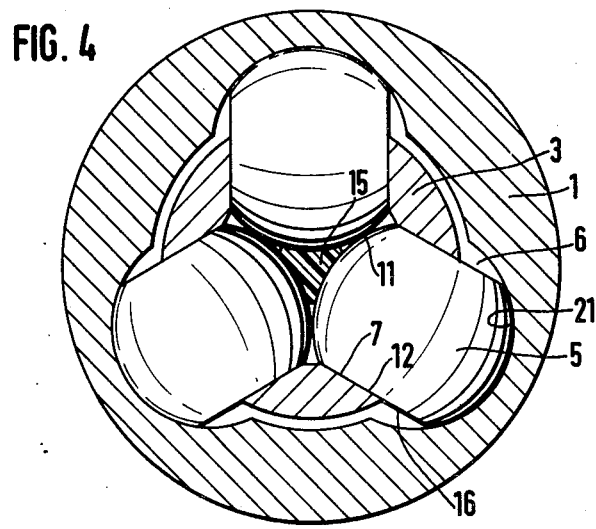
FIG. 4 is a sectional view taken along the lines III—III of the joint shown in FIG. 3.

A further embodiment of the invention is illustrated in FIGS. 3 and 4. This embodiment corresponds in principle to the embodiment shown in FIGS. 1 and 2. However, the difference arises in that the joint assembly of FIGS. 3 and 4 is depicted as a longitudinally sliding joint. This mode of operation is enabled because of the axially parallel disposition of the grooves 6 in the outer joint member 1. Thus, the inner joint member 3 together with the roller bodies 5 is slidable in the axial direction relative to the outer joint member due to the configuration of the grooves 6 in the outer joint member. With this form of construction, because of the selected disposition of the grooves 6, constant velocity or homokinetic drive transmission is practically not obtainable with a bending angle beyond about 10° because the roller bodies 5 will move radially away from the groove base 21 of the grooves 6 when the joint is subjected to rotation and bending deflection.

In the joint assembly illustrated in FIGS. 3 and 4, the cavity 10 of the inner joint member 3 has contained therein a rubber or plastic block or pad 15 which functions in a manner which does not effect the actual joint function of the assembly.

The roller bodies 5 provide mutual support for each other in the direction toward the center of the joint assembly at the contact engagement points 11. The cushion pad or block 15 prevents excessive noise generation during idling in joints where the roller bodies 5 have been mounted without press-fit in the apertures 12 of the recesses 7.

Figure 5:
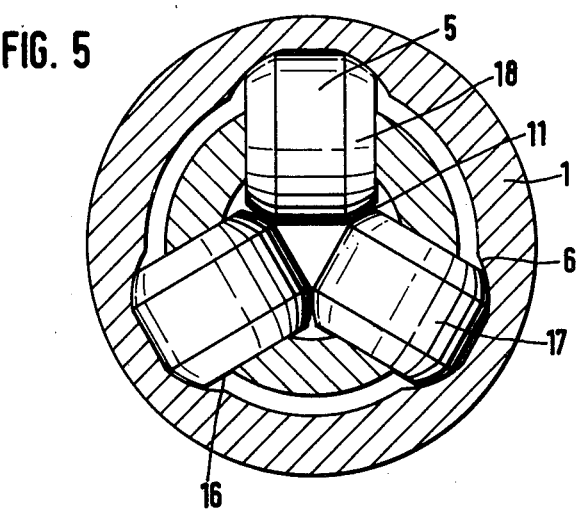
FIG. 5 is a transverse sectional view taken through a joint representing another embodiment of the invention wherein the roller bodies are formed as generally cylindrical pins with spherical end caps.
Figure 7:
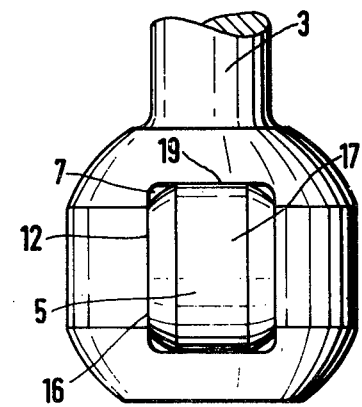

Another embodiment of the invention is depicted in FIGS. 5 and 7. In the joint embodiment depicted in FIG. 5, there is provided a further development which involves the fact that the roller bodies 5 are provided with circumferentially directed flat or planar surfaces for torque transmission whereby they engage with the aperture walls 12 of the recesses 7. Additionally, and in contrast with the roller bodies 5 shown in FIGS. 1–4, the roller bodies 5 shown in FIG. 5 include a cylindrical outer wall 17 which extends at right angles relative to the flats 16. The cylindrical wall 17 allows the roller bodies 5 to roll in the axial direction in the grooves 6 of the outer joint member 1. The roller bodies 5 depicted in FIG. 5 include spherical end caps 18 which operate, in the manner previously described, to effect mutual support at the points of mutual contact 11 between the roller bodies 5. Thus, in the embodiment of FIG. 5, as in the previous embodiments, spherical portions on the roller bodies are in contact with each other to provide mutual support between the roller bodies inwardly of the joint assembly.

Additionally, as in the other embodiments, the recesses 7 in the inner joint member 3 are formed to provide an opening for the roller bodies 5 having a cross sectional configuration which corresponds to the configuration of the roller bodies 5, as best seen in FIG. 7.

Figure 6:
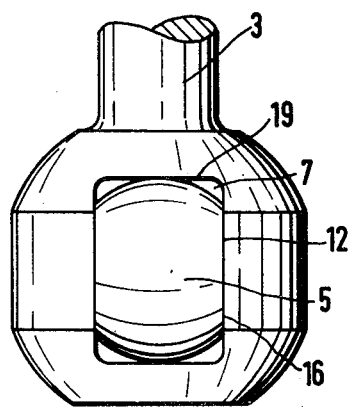
FIGS. 6 and 7 are, respectively, side views of an inner joint member with one of the roller bodies of each shown in detail in order to illustrate certain principles of the invention.

FIG. 6 depicts a somewhat different arrangement from the one shown in FIGS. 5 and 7. In FIG. 6, an inner joint member 3 having a roller body 5 received in the recess 7 provided therein is formed so that a planar contact engagement is effected in the circumferential direction between the roller body 5 and the inner joint member 3 along the aperture wall 12. However, in the axial direction there is only point contact engagement along the face 19 of the roller body 5. Thus, as will be seen from FIG. 6, the roller body 5 has a generally spherical surface extending completely over its outer area and, in contrast to other embodiments of the invention, such as that shown in FIG. 7, there is in the embodiment of FIG. 6 at least point contact with the face 19 and the roller 5 whereas in FIG. 7 there is linear contact in commensurate areas. A roller body such as that depicted in FIG. 7 can be produced, for example, from bar stock.

Figure 8:
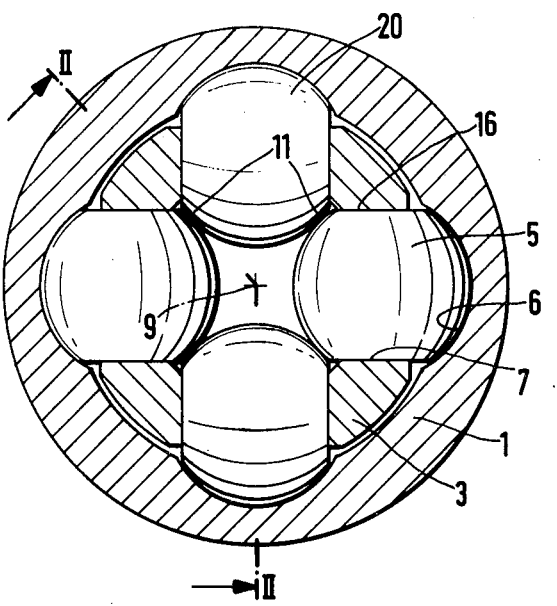
FIG. 8 is a transverse sectional view taken through a non-sliding joint utilizing four roller bodies, the sectional view being taken perpendicularly to the axis of rotation of the joint.
Figure 9:
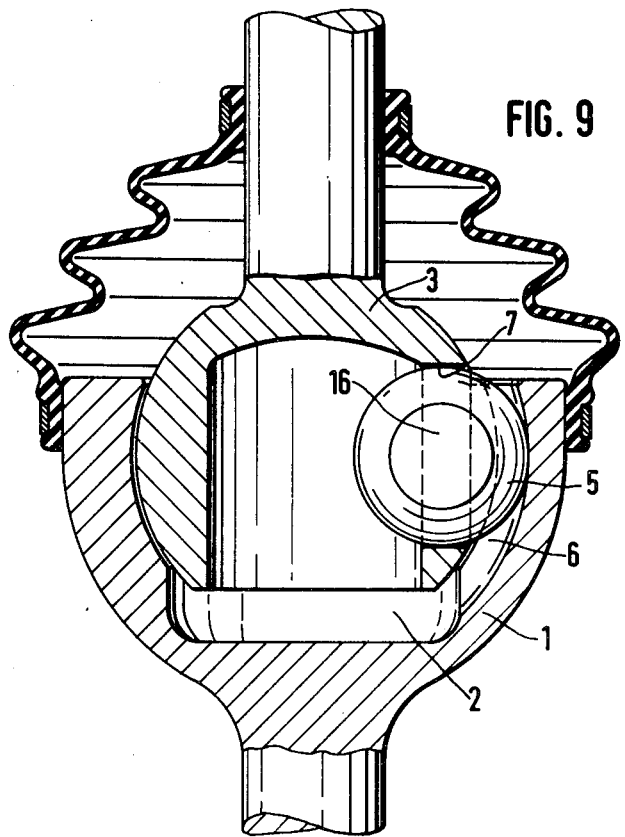
FIG. 9 is a sectional view taken along the line II—II of FIG. 8.

A further embodiment of the invention is shown in FIGS. 8 and 9. In this embodiment, there is provided a non-sliding or axially rigid joint. The grooves 6 of the outer joint member 1 are formed as a generally arcuate extension in a manner somewhat similar to that of the joint shown in FIGS. 1 and 2. The differences between the joint of FIGS. 8 and 9 and that of FIGS. 1 and 2 reside primarily in the fact that, in the FIGS. 8,9 embodiment, four roller bodies 5 are equidistantly circumferentially spaced within the cavity 2 of the outer joint member. Again, as in other embodiments, the arrangement depicted in FIGS. 8 and 9 is such that the four roller bodies 5 are arranged to provide mutual support for each other inwardly of the joint and each of the roller bodies are in point contact at the points 11. The roller bodies 5 are radially movably guided by their flats 16 in the recesses 7 of the inner joint member 3. With this type of joint assembly it is not possible to ensure homokinetic drive transmission despite the curvilinear form of the grooves 6.

It is, however, possible with rectilinear grooves 6 in the outer joint member 1 to construct an axially slidable joint similar to that shown in FIGS. 3 and 4.

Figure 10:
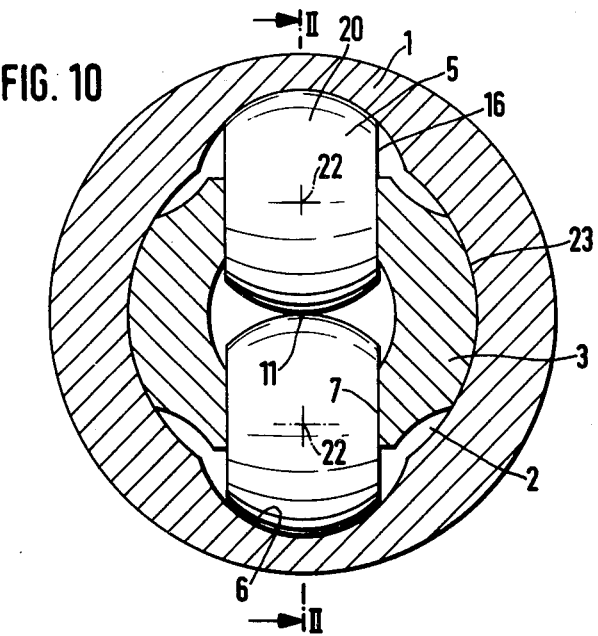
FIG. 10 is a transverse sectional view showing a non-sliding joint, which in principle is similar to the joint of FIG. 8, but which involves two roller bodies.
Figure 11:
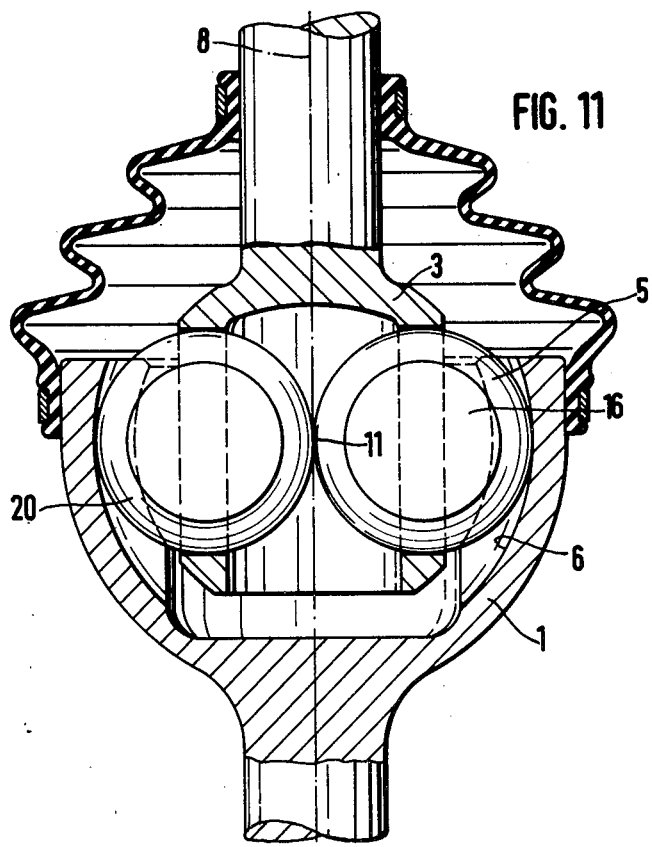
FIG. 11 is a sectional view taken along the line II—II in FIG. 10.

FIGS. 10 and 11 illustrate a joint assembly which comprises only two roller bodies 5 and which in many respects corresponds to the axially rigid joints shown in FIGS. 1, 2 and in FIGS. 8,9. Since only a pair or roller bodies 5 are provided in the embodiment of FIGS. 10,11, there is only one bearing or contact point 11 between the roller bodies 5 in the joint of this embodiment and this contact point 11 is situated on the rotation axis 8. The flats 16 of the roller bodies 5 are radially slidably guided in recesses 7 of the inner joint member 3. The construction of the embodiment of FIGS. 10 and 11 requires the provision on the outer joint member 1 of supporting faces 23 extending perpendicularly to the plane containing the centers 22 of the roller bodies whereof the generating radius would correspond to the radius of the cavity 2 in the outer joint member 1.

Additionally, this joint is also conceivable as an axially slidable joint. In such a case, the grooves 6 in the outer joint member 1 would be made to extend axially parallel as in the case of the embodiment of FIGS. 3 and 4. However, it is necessary that the bearing face 23 of the inner joint member 3 be spherical and axially movable in a cylindrical cavity 2 of the outer joint member.

In the embodiments according to FIGS. 8-11, it is also possible to include the aforementioned further development which resides in providing the roller bodies 5 with cylindrical wall faces 17 extending perpendicularly to the flats 16, as has been illustrated in connection with FIG. 5.

While specific embodiments of the invention have been shown and described in detail to illustrate the application of the inventive principles, it will be understood that the invention may be embodied otherwise without departing from such principles.

What is claimed is:

1. A cardan joint for transmitting driving torque comprising an inner joint member, an outer joint member, a plurality of roller bodies, aperture means in said inner joint member having said roller bodies radially slidably received therein for torque transmitting engagement therewith, and groove means in said outer joint member having said roller bodies guided therein, each of said roller bodies being arranged to extend radially from within said aperture means into engagement with said groove means thereby to effect transmission of torque between said inner and outer joint members, said roller bodies each having a spherical portion thereon, with a spherical portion of each roller body being in direct abutting contact with a spherical portion of at least one other roller body in said joint, said roller bodies being thus arranged to provide for each other mutual support radially inwardly of said joint by means of said direct abutting contact between said spherical portions thereof.

2. A joint according to claim 1 wherein said roller bodies further include planar surface means, and wherein said inner joint member includes therein recess means formed with planar faces, said roller bodies being located within said recess means with said planar surface means in abutment with said planar faces to rotatably fix said roller bodies relative to said inner joint member.

3. A joint according to claim 1 wherein said roller bodies are formed with a cylindrical configuration with said spherical portions being formed as spherical end caps of said cylindrical configuration, said inner joint member being formed with cylindrical recesses conforming to said cylindrical configuration of said roller bodies and receiving said roller bodies therein.

4. A joint according to claim 1 including resilient cushion means located within said inner joint member at a position surrounded by said roller bodies.

5. A joint according to claim 1 wherein said inner and outer joint members are arranged to rotate about a common axis, said groove means being configured to engage therein said roller bodies in a manner to prevent relative axial displacement of said roller bodies along said groove means.

6. A joint according to claim 1 wherein said inner and outer joint members are arranged to rotate about a common axis, said groove means being configured to engage therein said roller bodies in a manner to permit relative axial displacement of said roller bodies along said groove means.

7. A joint according to claim 1 wherein said roller bodies are circumferentially equidistantly spaced about said cardan joint.

* * * * *